(12) United States Patent
Mielke

(10) Patent No.: US 7,516,973 B2
(45) Date of Patent: Apr. 14, 2009

(54) MOTORCYCLE STANDS

(76) Inventor: Gerardo Mielke, 16622 Diane, Bellflower, CA (US) 90706

( * ) Notice: Subject to any disclaimer, the term of this patent is extended or adjusted under 35 U.S.C. 154(b) by 371 days.

(21) Appl. No.: 11/401,685

(22) Filed: Apr. 11, 2006

(65) Prior Publication Data

US 2006/0231512 A1 Oct. 19, 2006

Related U.S. Application Data

(60) Provisional application No. 60/670,989, filed on Apr. 14, 2005.

(51) Int. Cl.
*B62H 7/00* (2006.01)

(52) U.S. Cl. .................. 280/293; 280/298; 280/301; 248/352; 248/188.8

(58) Field of Classification Search .............. 248/352, 248/354.1, 354.5, 188.8, 188.9, 188.91, 346.01, 248/292.13; 280/296, 293, 298, 301, 304, 280/302, 303, 76.1
See application file for complete search history.

(56) References Cited

U.S. PATENT DOCUMENTS

| | | | | |
|---|---|---|---|---|
| 456,347 A * | 7/1891 | Taylor | ........................ | 280/298 |
| 1,143,780 A * | 6/1915 | Pinto | ......................... | 280/298 |
| 2,702,197 A * | 2/1955 | Sabatino | .................... | 280/298 |
| 3,712,640 A * | 1/1973 | Shipman et al. | ............. | 280/301 |
| 4,417,746 A * | 11/1983 | Baron | ........................ | 280/301 |
| 4,580,804 A * | 4/1986 | Weber | ........................ | 280/300 |
| 4,637,624 A * | 1/1987 | Shur | .......................... | 280/298 |
| 4,817,977 A * | 4/1989 | Bookbinder | ................ | 280/304 |
| 4,986,557 A * | 1/1991 | Muszynski | .................. | 280/298 |
| 5,372,375 A * | 12/1994 | Mahoney | .................... | 280/304 |
| 5,607,173 A * | 3/1997 | Lai | ............................ | 280/293 |
| 6,494,423 B1 * | 12/2002 | Ruth | ...................... | 248/188.8 |
| 7,097,191 B2 * | 8/2006 | Griggs | ........................ | 280/298 |
| 2006/0157625 A1 * | 7/2006 | Griggs | .................... | 248/188.8 |

FOREIGN PATENT DOCUMENTS

| | | |
|---|---|---|
| CH | 88667 | 3/1920 |
| DE | 196775 | 7/1907 |
| DE | 82 25 833.3 U1 | 12/1982 |

* cited by examiner

*Primary Examiner*—Kimberly T Wood
(74) *Attorney, Agent, or Firm*—Blakely Sokoloff Taylor & Zafman LLP

(57) ABSTRACT

A stand for a two wheeled vehicle having a hollow axle comprising, the stand having a telescoping support assembly having a foot at a first end thereof, the telescoping support assembly being extendable between an unextended position and an extended position and being releasably lockable in the extended position, a latch for releasably maintaining the telescoping support assembly in the extended position, a first member being disposable at first and second angular positions relative to a second end of the telescoping support assembly, the first angular position being coaxial with the telescoping support assembly and the second angular position being a predetermined angle with respect to the telescoping support assembly, the first member being releasably lockable in the second angular position. The stand is configured to fit and be retained within a hollow axle for storage, and to be deployed to provide a side stand using the hollow axle for reference to the two wheeled vehicle. Various embodiments are disclosed.

17 Claims, 5 Drawing Sheets

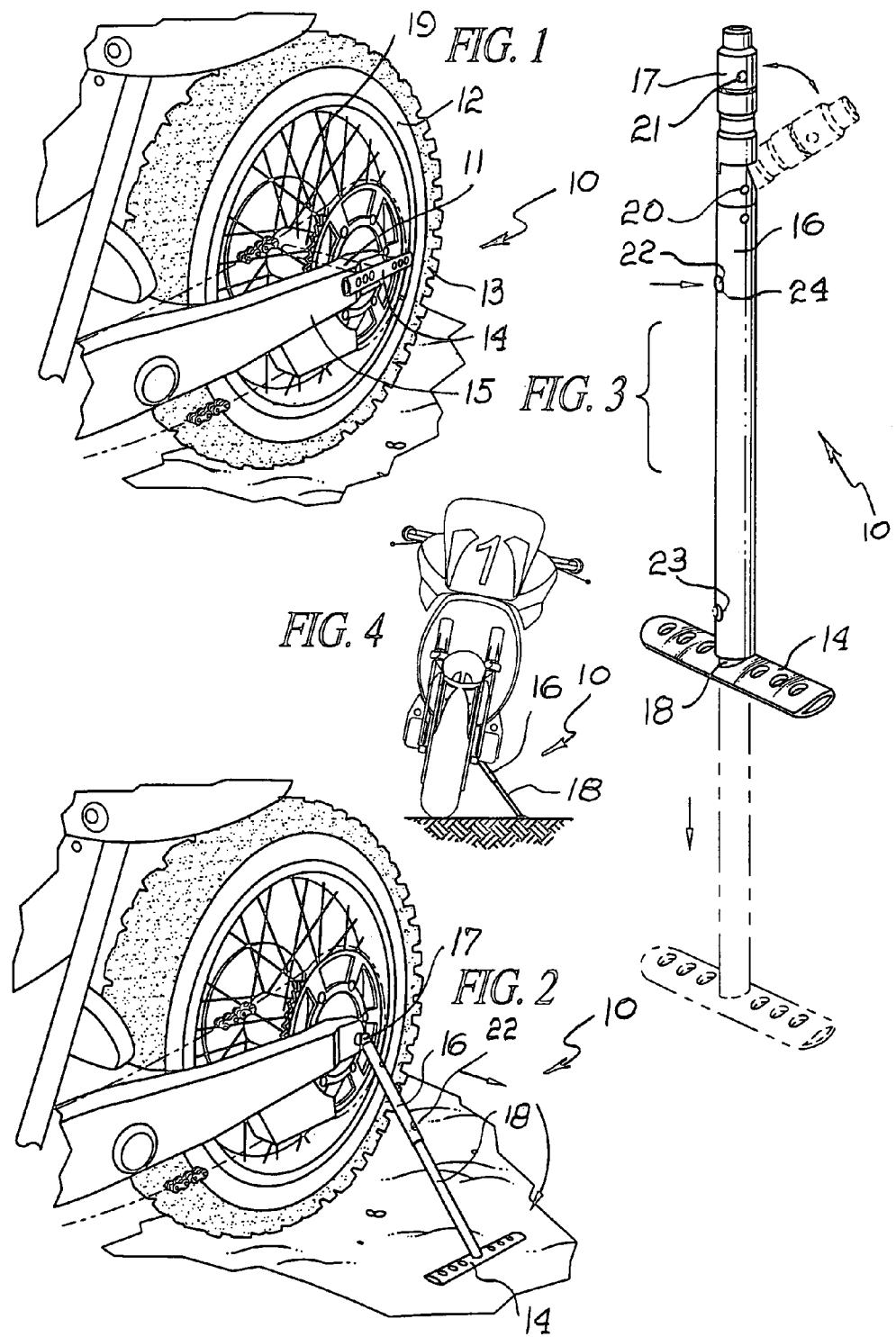

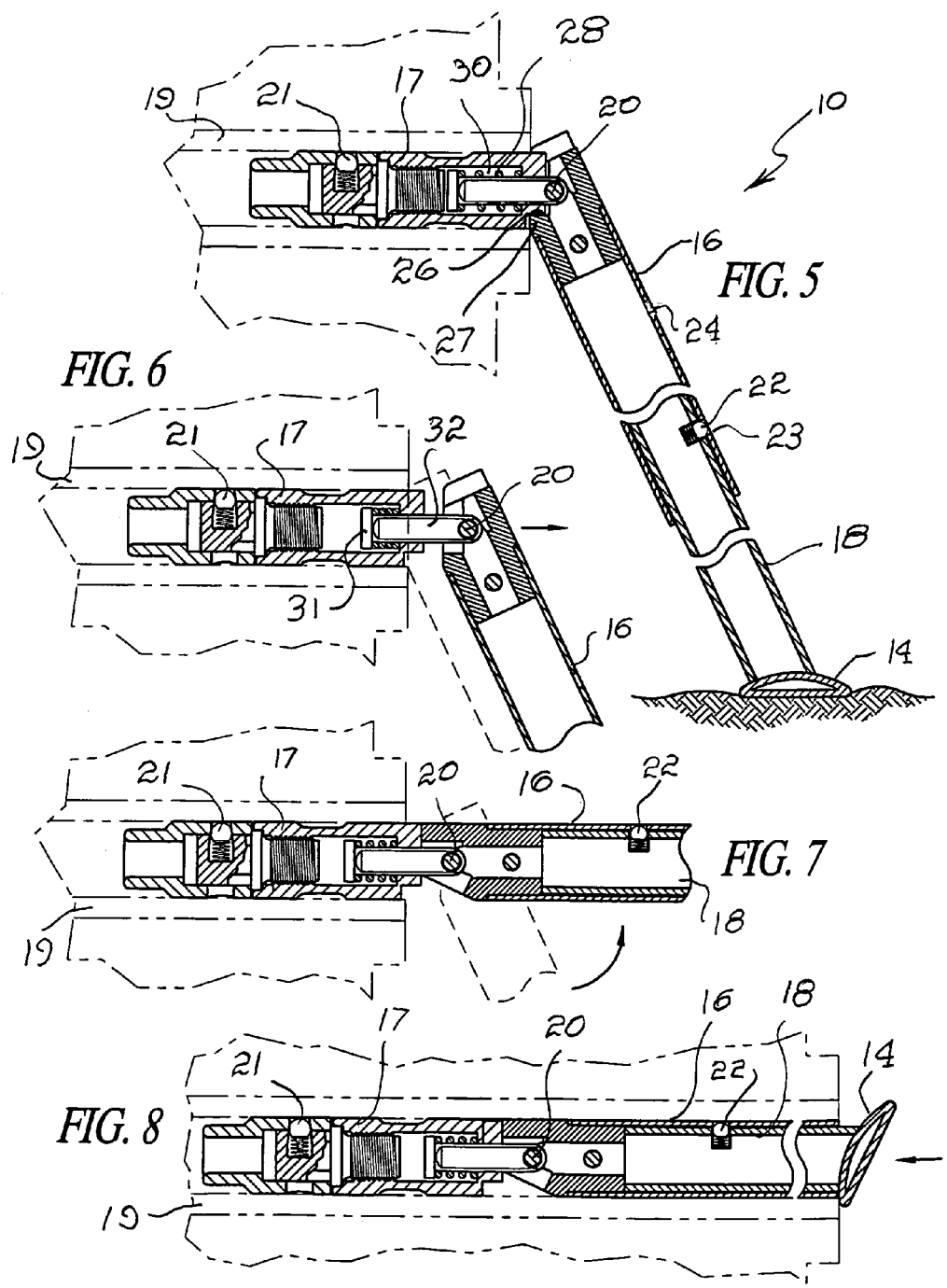

MOTORCYCLE STANDS

CROSS-REFERENCE TO RELATED APPLICATION

This application claims the benefit of U.S. Provisional Patent Application No. 60/670,989 filed Apr. 14, 2005.

BACKGROUND OF THE INVENTION

1. Field of the Invention

The present invention relates to the field of support stands, and more particularly to novel stands for supporting a motorcycle in a static or leaning position and which may be stored in the open-ended bore of the rear axle when not in use.

2. Prior Art

In the past, it has been the conventional practice to provide a stand for a two-wheeled vehicle, such as a motorcycle, bike or the like, by employing a deployable stand having one end pivotally mounted to the vehicle frame and the other end extendable for ground engagement. The pivot end is a fixed structure that usually represents a substantial mass, and attachment of the pivot end of the stand generally requires a weldment for permanent securement. Such an installation is permanent and is not intended to be detachably connected to the frame. Generally, the stand is located at a midpoint on the frame between the front and rear wheels of the motorcycle.

Problems and difficulties have been encountered with using conventional motorcycle stands which stem largely from the fact that a permanent attachment to the frame is necessary, and the location of the stand, being midway between the wheels, often times becomes an obstacle for mounting and dismounting the motorcycle by the rider.

Therefore, a long-standing need has existed to provide support stands for two-wheeled vehicles, such as a motorcycle, which will not interfere with the rider's use of the vehicle and which is not permanently attached to the frame of the motorcycle. The stand should be detachably connected to a portion of the motorcycle which will support the weight of the motorcycle in a leaning orientation and which employs articulated support members so that the stand may be deployed from a stored position on the motorcycle to an operative support position holding the bike in the leaning orientation.

BRIEF DESCRIPTION OF THE DRAWINGS

FIG. 1 is a perspective view of the back end of a conventional motorcycle incorporating an embodiment of the inventive motorcycle stand in its stored position on the rear axle of the vehicle.

FIG. 2 is a perspective view, similar to the view of FIG. 1, illustrating the stand deployed into its operative position for supporting the motorcycle.

FIG. 3 is a perspective view of the motorcycle stand illustrating adjustability for length.

FIG. 4 is a reduced front elevational view of a conventional motorcycle illustrated in a leaning position supported by the inventive motorcycle stand in its operative position.

FIG. 5 is a longitudinal sectional view of the motorcycle stand in its operative position.

FIG. 6 is a sectional view of the motorcycle stand preparatory for deployment into its storage position.

FIG. 7 is a sectional view, similar to the view of FIG. 6, illustrating a further step in preparing the motorcycle stand for storage within the open bore of a wheel axle.

FIG. 8 is a sectional view illustrating positioning of the motorcycle stand into the bore of an axle to complete storage thereof.

DETAILED DESCRIPTION OF THE PREFERRED EMBODIMENTS

Figure 9:
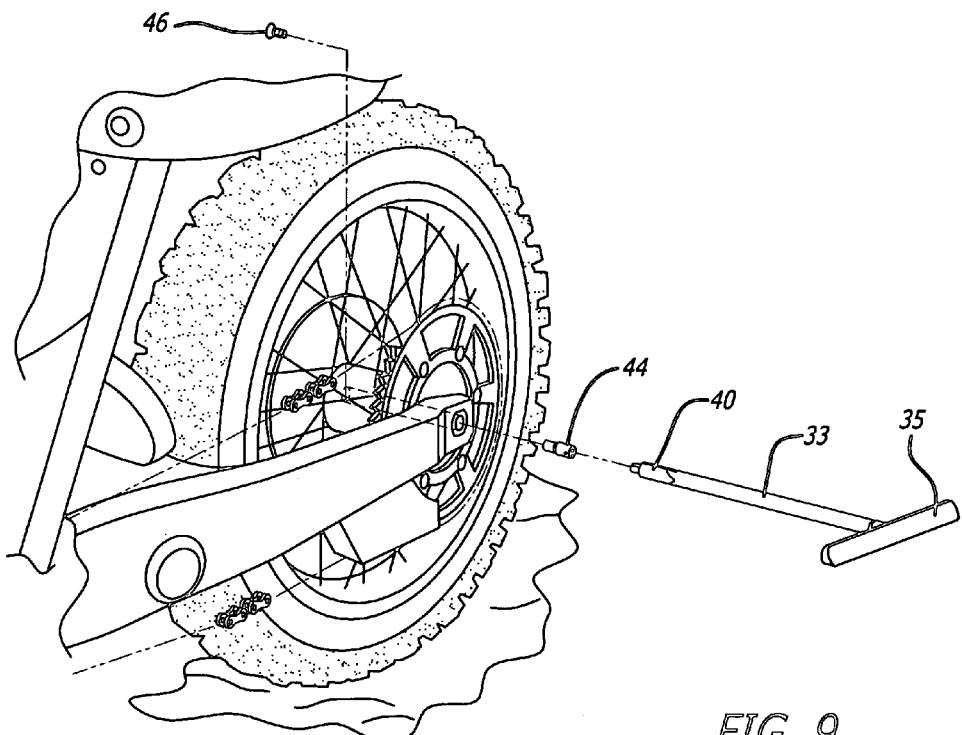
FIG. 9 is a perspective view of the back end of a conventional motorcycle illustrating, in a partially exploded view, another embodiment of the inventive motorcycle stand and it's mounting within the rear axle of the vehicle.

Accordingly, the above problems and difficulties are avoided by the present invention that provides an adjustable length support member having a foot attached at its distal end for engaging the ground in order to support the motorcycle in a leaning position. In one embodiment, the opposite end of the support member includes a joint member which is pivotally attached to the end of the support member. The joint member is insertably received into the open-ended bore of the rear axle conventionally carried on the motorcycle and includes a biasing means for engaging and disengaging the support member to and from the joint member so as to permit pivoting of the support member to an angular disposition with respect to the joint member. A locking shoulder means via the biasing means releasably secures the end of the support member to the end of the joint member when the angle of the support member has been achieved. For extending the length of the support member, an extension rod or tube is slidably mounted within the support member and latch means are cooperatively provided between the rod or tube and the support member so that a pre-arranged adjustment can be made for length of the overall support member. A spring detent is provided on the joint member for releasably retaining the joint member in the bore of the axle.

In another embodiment, the end of the support member opposite the foot includes a member that is attachable to the end of the support member in either of two orientations, a first being concentric with the support member for storage in the rear axle of a motorcycle and the second being at angle with respect to the support member for functioning as a stand. Other aspects of this embodiment are similar to the first embodiment.

Therefore, it is among the objects of the present invention to provide novel support stands for motorcycles which are adjustable in length and which are detachably mounted to the rear axle of the motorcycle and wherein the stands may be deployable between a stored position on the axle and an operative position to support a motorcycle in a leaning position.

Another object of the present invention is to provide novel stands for motorcycles which are not permanently attached to the frame or any other portion of the motorcycle and which may be conveniently and manually deployed from a stored position on the axle of a motorcycle to an operative position supporting the motorcycle.

Yet another object resides in providing a support for a two wheeled vehicle which includes a member releasably retained on the rear axle of the vehicle and which further includes a support member having a stored position on the axle and an operative position outwardly extendable for supporting the vehicle in a leaning position.

Referring to FIG. 1, one embodiment of the novel motorcycle stand incorporating the present invention is illustrated in the general direction of arrow 10 by numeral 11 and is illustrated as being in a storage position so that the motorcycle can be ridden in a normal fashion without interference from the stand 10. It is to be noted that the stand 10 is detachably carried on an axle 19 as part of a rear wheel 12 including tire 13. The stand 10 includes a foot 14 that is the only component of the stand that is exposed when the stand is in the storage position. The foot 14 bears against or is adjacent a housing cover 15. Therefore, it can be seen that the motorcycle stand 10 is mounted on the rear axle 11 and is deployable between a storage position, as shown in FIG. 1, and an extended or operational position, as shown in FIGS. 2 and 4, respectively.

Referring now in detail to FIG. 2, it can be seen that the motorcycle stand 10 includes a tubular support member 16 having one end pivotally joined to an anchor or a joint member 17. If it is desired to lengthen the support member 16, a rod or tubular extension 18 may be extended from the member 16 and held in position by a latch 22. In FIGS. 2 and 4, the support stand is deployed into its operative position to support the motorcycle in a leaning orientation. The rod 18 has been extended from the end of support member 16 so that the foot 14 rests on ground level. The joint member 17 resides within the axle of the rear wheel as an anchor or mounting member.

Referring now to FIG. 3, it can be seen that the joint member 17 is pivotally carried on the upper end of support member 16 by means of a pivot 20. The joint member 17 further includes a retaining detent 21 which is spring biased to bear against the inner surface of the open-ended bore within the axle 19 in order to releasably retain the support stand in either its storage or operative position. As illustrated in broken lines, the joint member 17 has been pivoted for either insertion into the bore of the axle or to illustrate deployment of the support member 16. The manual latch 22 comprises a spring biased button which protrudes through an opening 24 in the support member 16 in order to hold the rod 18 therein. When it is desired to extend the length of the support member 16, the latch 22 is depressed permitting the rod 18 to be withdrawn from the support member to the position shown in broken lines and the rod is held in this position by the push-button latch 22 engaging with a hole 23 at the lower end of the support member 16.

Referring now in detail to FIG. 5, it can be seen that the support member or arm 16 has been outwardly deployed to its operative position by withdrawing the support member out of the axle 19 and pivoting about pivot 20 to the latched position shown. The longitudinal axis of the support member is angular with respect to a vertical axis. It can be seen that foot 14 rests on the ground and that rod 18 has been extended from its position inside the bore of support member 16.

The rod 18 is retained in the extended position by means of latch 22 engaging with hole 23. Upon retraction of the extension rod 18 into support member 16, latch 22 will be retained in opening 24. It is to be noted that the latch 22 is spring biased outwardly so that the normal bias of the latch is to occupy either opening 24 or opening 23. The joint member 16 includes the detent 21 that is outwardly urged by an expansion spring to bear against the bore of axle 19 to releasably retain the entire support assembly in place. Once the support member is in place as shown in FIG. 5, note that the member 16 is locked to the joint member by means of engaging shoulders 26 on the end of joint member 17 and shoulder 27 near the end of support member 16. The pair of shoulders are pulled together by means of an expansion spring 28 which bears against one end of the joint member within chamber 30 and bears against an element 31 at its opposite end. The element 31 is carried at the end of a slide mount 32 that has the pivot 20 at its end opposite to element 31. Therefore, as the mount 32 slidably moves in and out of the end of joint member 17 in response to compression or expansion of spring 28, the shoulders 26 and 27 are engaged or disengaged.

Referring now to FIG. 6, it can be seen that the shoulders 26 and 27 are disengaged as the joint member 17 is moved in the direction of the arrow. The solid line showing of support member 16 is representative of a disengagement of the shoulders while in broken lines, engagement is illustrated as in FIG. 5. The compression of spring 28 is manual by pulling the end of support 16 outwardly in the direction of the arrow.

To store the support member within the bore of axle 19 from the position shown in FIG. 5, the support member is pulled in the direction of the arrow shown in FIG. 6, followed by pivoting of the support member in the direction, as shown in FIG. 7. The shoulders are disengaged and the support member is free to rotate about pivot 20. As shown in FIG. 7, the longitudinal axis of the support member 16 and the joint member 11 are coaxially disposed with respect to one another and the members 16 and 17 can then be pushed in the direction of the arrow shown in FIG. 8 for storage within the bore of the axle 19. Abutment of the foot 14 with the end of the axle serves as a stop and the showing in FIG. 8 is also the showing in FIG. 1 of the support member in its storage position.

To deploy the support member into its operative position, the reverse of the procedures described and shown in FIGS. 5-8 are followed. From the storage position shown in FIG. 8, the support member 16 and joint member 17 are slid through the bore of axle 19 while still being retained therein by the retaining detent 21. When the end of joint member 17 is beyond the terminating end of the axle, as shown in FIG. 7, the support member 16 can be pulled in the direction of the arrow shown in FIG. 6 to compress the spring 28 and the member can be pivoted into the operative position, as shown in FIG. 5, wherein the engagement of shoulders 26 and 27 can be permitted due to the expansion of spring 28 so that a releasable locking means is provided. To extend the length of the support member, the tube or rod 18 may be deployed, as previously described by releasing the latch 22 and engaging the latch into the lower opening 23.

Now referring to FIGS. 9 through 12, an alternate embodiment of the present invention may be seen. This embodiment is functionally equivalent to the first embodiment, though differs in certain structural aspects. In particular, as may be best seen in the exploded view of FIG. 10, a telescoping assembly comprising a tubular support member 33, similar to the tubular support member 16 of the prior embodiment, is used together with a tubular extension 34, similar to tubular extension 18 in the prior embodiment. The tubular extension 34 has a foot 35, also similar to the foot 14 of the prior embodiment. A push button spring detent 36, similar to push button detent 22 of the prior embodiment, is provided to lock the telescoping assembly comprising tubular support member 33 and tubular extension 34 in an unextended position by engagement of the push button with hole 37 in tubular support member 33, or in one of two extended positions by engagement with hole 38 or 39 in the tubular support member 33.

Figure 10:
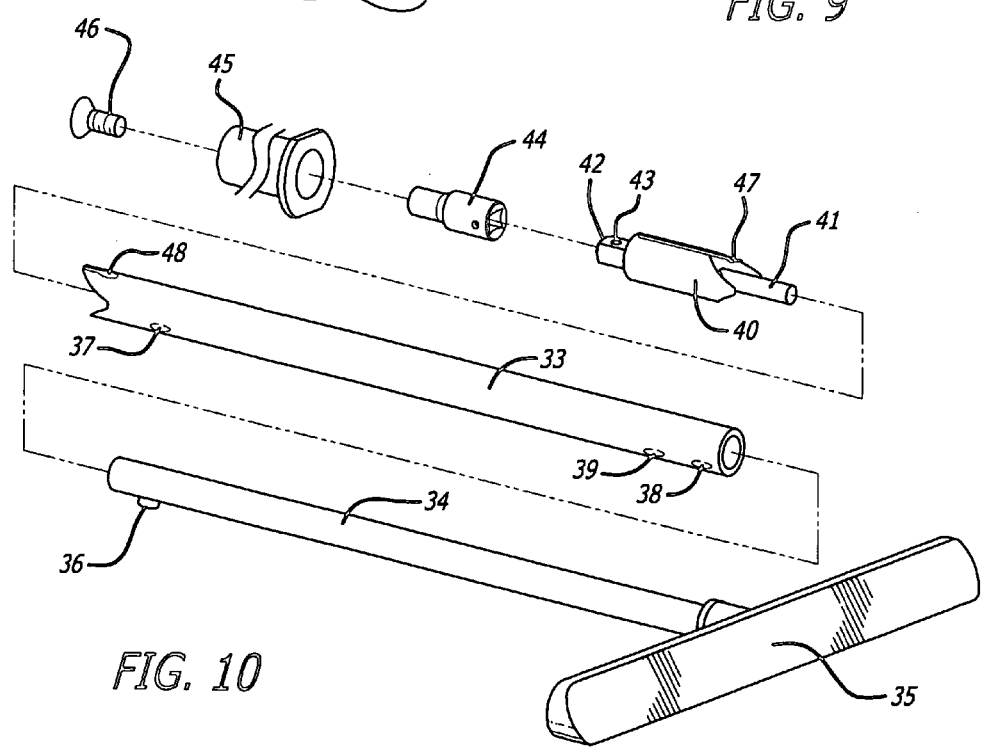
FIG. 10 is an exploded perspective view of the stand of FIG. 9
Figure 11:
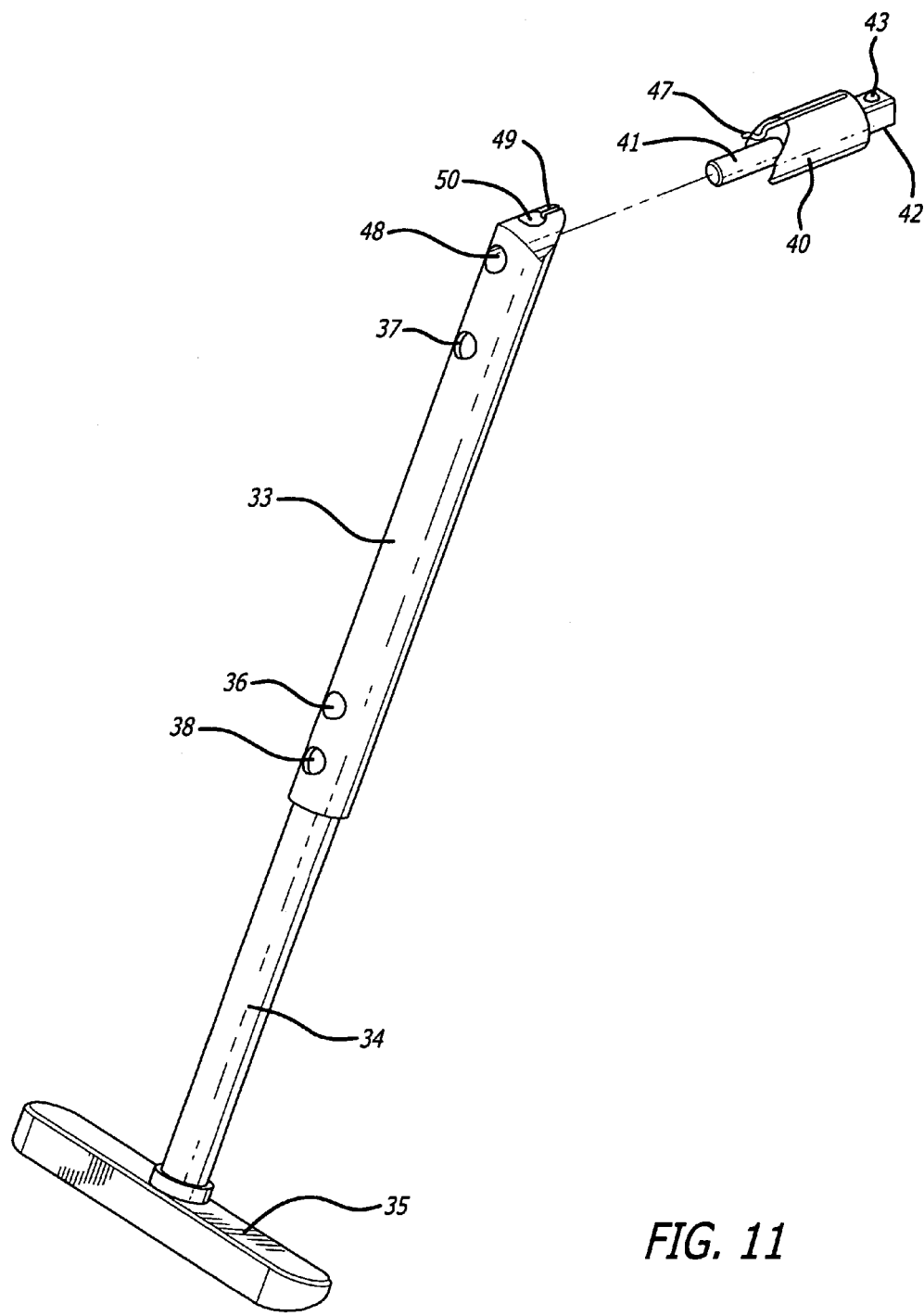
FIG. 11 is a perspective view of the stand of FIG. 9 illustrating the stand about to be deployed into its operative state.
Figure 12:
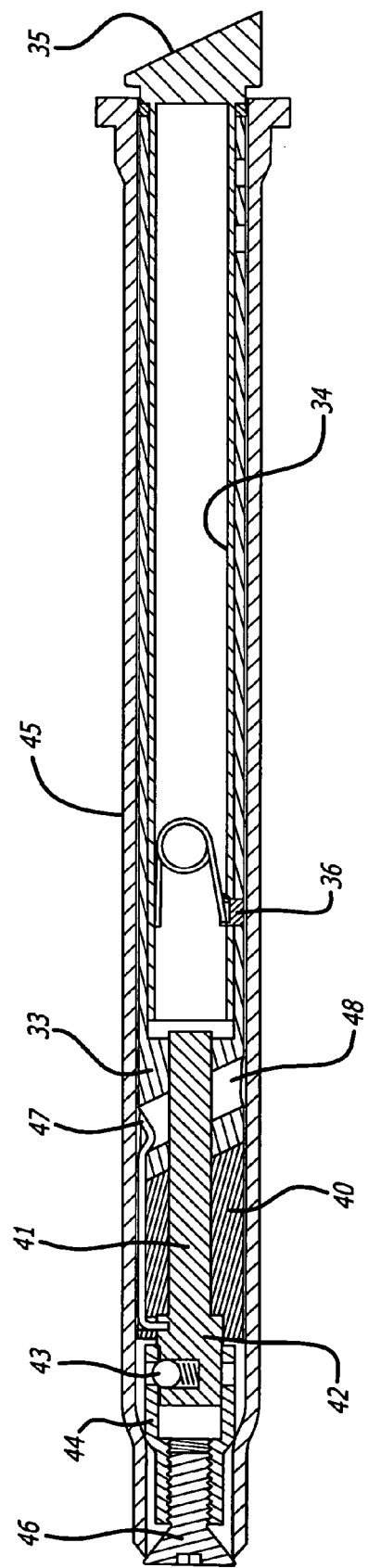
FIG. 12 is a cross section taken through a motorcycle axle and the stand of FIG. 9 as stored therein between uses.

FIG. 12 presents a cross-section of the embodiment illustrated in FIGS. 9 through 11. The tubular support member 33, the tubular extension 34 and the foot 35, as well as the spring loaded push button 36, may be seen therein. Also shown therein is a member 40 having a pin 41 which may extend longitudinally into a hole in the end of tubular support member 33, as shown in FIG. 12. The pin 41 also has a square end 42 thereon with a spring loaded ball 43 for providing a detent type engagement with retaining member 44, held and angularly oriented within hollow axle 45 by a screw 46 fastening the retaining member 44 to the internal end of the hollow axle. A spring member 47 in a slot in member 40 retains pin 41 with respect to member 40, as well as provides a spring detent to releasably retain member 40 with respect to tubular support member 33 when in the orientation illustrated in FIGS. 9, 10 and 12.

Also visible, particularly in FIGS. 10 and 12, is a hole 48 passing through the end of tubular support member 33 at an angle with respect to the axis thereof. With the assembly in the angular orientation illustrated in FIGS. 9, 10 and 12, the end of hole 48 cooperates with the end of spring 47 to provide a detent to retain member 40 in the position shown with respect to the tubular support member 33. However, member 40, with pin 41 thereon, may be withdrawn from the coaxial engagement with the end of tubular support member 33 as illustrated in FIGS. 9, 10 and 12, and instead, coupled to the tubular support member 33 by passing pin 41 through hole 48 to be retained in that position by spring 47 lying within slot 49 and passing into hole 50 in the end of tubular support member 33. When so positioned, the stand of this embodiment may function as previously illustrated with respect to FIGS. 2 and 4. Thus in the embodiment of FIGS. 1 through 8, one end of the overall assembly may be rotated through an angle between a first angular orientation with respect to the telescoping assembly wherein the end configured to extend into the hollow axle is co-linear with the telescoping assembly, and a second angular position facilitating use of the assembly as a motorcycle stand, whereas in the embodiment of FIGS. 9 through 12, the end of the assembly is similarly capable of being oriented at either of these two angular positions, though by removing the end of the assembly and repositioning the same with respect to the telescoping assembly. Obviously also, there are other differences in design detail, though the function and use of these, as well as other embodiments, is the same.

Thus while particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A stand for a two wheeled vehicle having a hollow axle comprising:
   a telescoping support assembly having a foot at a first end thereof, the telescoping support assembly being extendable between an unextended position and an extended position and being releasably lockable in the extended position;
   a latch for releasably maintaining the telescoping support assembly in the extended position;
   a first member being disposable at first and second angular positions relative to a second end of the telescoping support assembly, the first angular position being coaxial with the telescoping support assembly and the second angular position being a predetermined angle with respect to the telescoping support assembly, the first member being releasably lockable in the second angular position;
   the telescipong support member and the first assembly being configured to fit within the hollow axle and the first member being configured to be releasably retained within the hollow axle; and,
   a retaining member configured to be attached to and within the hollow axle, and wherein the first member is configured to be releasably retained within the hollow axle by engagement with the retaining member.

2. The stand of claim 1 wherein the telescoping support assembly is releasably lockable in either of at least two extended positions.

3. The stand of claim 1 wherein the telescoping support assembly is also releasably lockable in the unextended position.

4. The stand of claim 1 wherein the first member is also releasably lockable in the first angular position.

5. The stand of claim 1 wherein the first member is pivotably connected to the telescoping support assembly.

6. The stand of claim 1 wherein the first member is detachable and reattachable to the telescoping support assembly in either of the first and second angular positions.

7. The stand of claim 1 wherein the telescoping assembly comprises an outer tubular member and an inner member having the foot on one end thereof.

8. The stand of claim 7 wherein the inner member is also a tubular member.

9. The stand of claim 1 wherein the telescoping support assembly and the first member provide a substantially continuous outer surface of a uniform diameter when the first member is in the first angular position.

10. A stand for a two wheeled vehicle having a hollow axle comprising:
    a telescoping support assembly having an outer tubular member and an inner member, the inner member having a foot at a first end of the telescoping support assembly, the telescoping support assembly being extendable between an unextended position and an extended position and being releasably lockable in the extended position;
    a latch for releasably maintaining the telescoping support assembly in the extended position;
    a first member being disposable at first and second angular positions relative to a second end of the telescoping support assembly, the first angular position being coaxial with the telescoping support assembly and the second angular position being a predetermined angle with respect to the telescoping support assembly, the first member being releasably lockable in the second angular position, and being configured to be releasably retained within the hollow axle; and,
    a retaining member attached to and within the hollow axle, and wherein the first member is configured to be releasably retained within the hollow axle by engagement with the retaining member.

11. The stand of claim 10 wherein the telescoping support assembly is releasably lockable in either of at least two extended positions.

12. The stand of claim 10 wherein the telescoping support assembly is also releasably lockable in the unextended position.

13. The stand of claim 10 wherein the first member is also releasably lockable in the first angular position.

14. The stand of claim 10 wherein the first member is pivotably connected to the telescoping assembly.

15. The stand of claim 10 wherein the first member is detachable and reattachable to the telescoping assembly in either of the first and second angular positions.

16. The stand of claim 10 wherein the inner member is also a tubular member.

17. The stand of claim 10 wherein the telescoping support assembly and the first member provide a substantially continuous outer surface of a uniform diameter when the first member is in the first angular position.

* * * * *